United States Patent [19]

Abe et al.

[11] Patent Number: 5,119,302

[45] Date of Patent: Jun. 2, 1992

[54] STEERING ANGLE DETECTING DEVICE

[75] Inventors: Masaru Abe; Yoshimichi Kawamoto; Mitsuya Serizawa; Osamu Tsurumiya, all of Tochigi, Japan

[73] Assignee: Honda Giken Kogyo Kabushiki Kaisha, Tokyo, Japan

[21] Appl. No.: 546,150

[22] Filed: Jun. 28, 1990

[30] Foreign Application Priority Data

Jun. 28, 1989 [JP] Japan .................. 1-166071

[51] Int. Cl.⁵ ............................................ B62D 5/00
[52] U.S. Cl. ............................ 364/424.05; 180/142; 364/559
[58] Field of Search .............. 364/424.05, 559; 180/79.1, 140, 141, 142, 143; 280/91

[56] References Cited

U.S. PATENT DOCUMENTS

| 4,794,536 | 12/1988 | Eto et al. ................ 364/424.05 |
| 4,803,629 | 2/1989 | Noto et al. ..................... 180/142 |
| 4,872,116 | 10/1989 | Ito et al. ......................... 180/142 |
| 5,001,637 | 3/1991 | Shiraishi et al. ................ 180/142 |

FOREIGN PATENT DOCUMENTS 60-43473  3/1985  Japan .

Primary Examiner—Gary Chin

Attorney, Agent, or Firm—Irving M. Weiner; Joseph P. Carrier; Pamela S. Burt

[57] ABSTRACT

A steering angle detecting device employs an analog sensor and a digital sensor to detect a displacement of a component which is displaceable depending on a change in a steering angle in a steering apparatus. The steering angle detecting device includes an analog sensor for detecting a displacement of the component and producing an analog signal having a potential corresponding to the position of the component, a digital sensor for detecting the displacement of the component and producing a predetermined number of pulses corresponding to a unit change in the steering angle, a basic count determining unit for determining a basic count corresponding to the steering angle based on the analog signal produced by the analog sensor when a steering angle starts to be detected, a counter for generating and holding a count corresponding to the steering angle by adding or subtracting the number of pulses produced by the digital sensor to or from the basic count, a steering angle calculating unit for calculating a steering angle based on the count, and a correcting unit for correcting the count when the component is positioned in a position corresponding to a predetermined reference steering angle.

10 Claims, 7 Drawing Sheets

3
STEERING ANGLE DETECTING DEVICE

BACKGROUND OF THE INVENTION

1. Field of the Invention

The present invention relates to a steering angle detecting device for use in steering control systems for motor vehicles.

2. Description of the Relevant Art

There have recently been developed four-wheel steering apparatus for motor vehicles whererin a four wheel steering mechanism and a rear wheel steering mechanism are not mechanically coupled to each other and also front-wheel steering apparatus for motor vehicles wherein a steering wheel and steerable road wheels are not mechanically connected to each other. Since such a steering apparatus requires the steering angle to be controlled through a feedback loop, it has a steering angle detecting device which detects the steering angle of the steering wheel and the steering angle of front or rear road wheels. In general, the steering angle detecting device has been in the form of an analog sensor such as a differential transformer or a digital sensor such as an increment-type rotary encoder as disclosed in Japanese Laid-Open Utility Model Publication No. 60-43473, for example.

The analog sensor is however problematic in that its output characteristics are easily subject to changes due to fluctuations in the power supply voltage and changes in the temperature, resulting in low detecting accuracy. If the analog sensor is small in size, its output voltage (indicated by the solid-line curve in FIG. 7 of the accompanying drawings) deviates from the ideal linear pattern (indicated by the broken-line curve) in a larger steering angle range. Therefore, linear output voltage pattern is not maintained and the detecting accuracy is low in the larger steering angle range.

The digital sensor is advantageous in that it is immune to disturbances such as voltage fluctuations and hence has a high detecting accuracy. However, since pulses produced at the time the steering angle varies are counted by a counter, when the ignition key is turned off, or the battery is removed for maintenance or otherwise the power supply is turned off, the count of the counter must be stored in a memory, and the memory adds to the cost of the digital sensor. In order to solve the above problem, there has been proposed a digital sensor which has a means for generating a reference signal in the steering neutral position. The proposed digital sensor however fails to detect the steering angle until the steering angle reaches the reference position, and therefore is not suitable for the feedback control of the steering angle in a steering apparatus which is required to control the steering angle highly accurately throughout a full operation range beginning from an initial stage of operation.

SUMMARY OF THE INVENTION

According to the present invention, there is provided a steering angle detecting device for a steering apparatus having a component which is displaceable depending on a change in a steering angle, comprising an analog sensor for detecting a displacement of the component and producing an analog signal having a potential corresponding to the position of the component, a digital sensor for detecting the displacement of the component and producing a predetermined number of pulses corresponding to a unit change in the steering angle, basic count determining means for determining a basic count corresponding to the steering angle based on the analog signal produced by the analog sensor when a steering angle starts to be detected, counting means for generating and holding a count corresponding to the steering angle by adding or subtracting the number of pulses produced by the digital sensor to or from the basic count, steering angle calculating means for calculating a steering angle based on the count, and correcting means for correcting the count when the component is positioned in a position corresponding to a predetermined reference steering angle.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
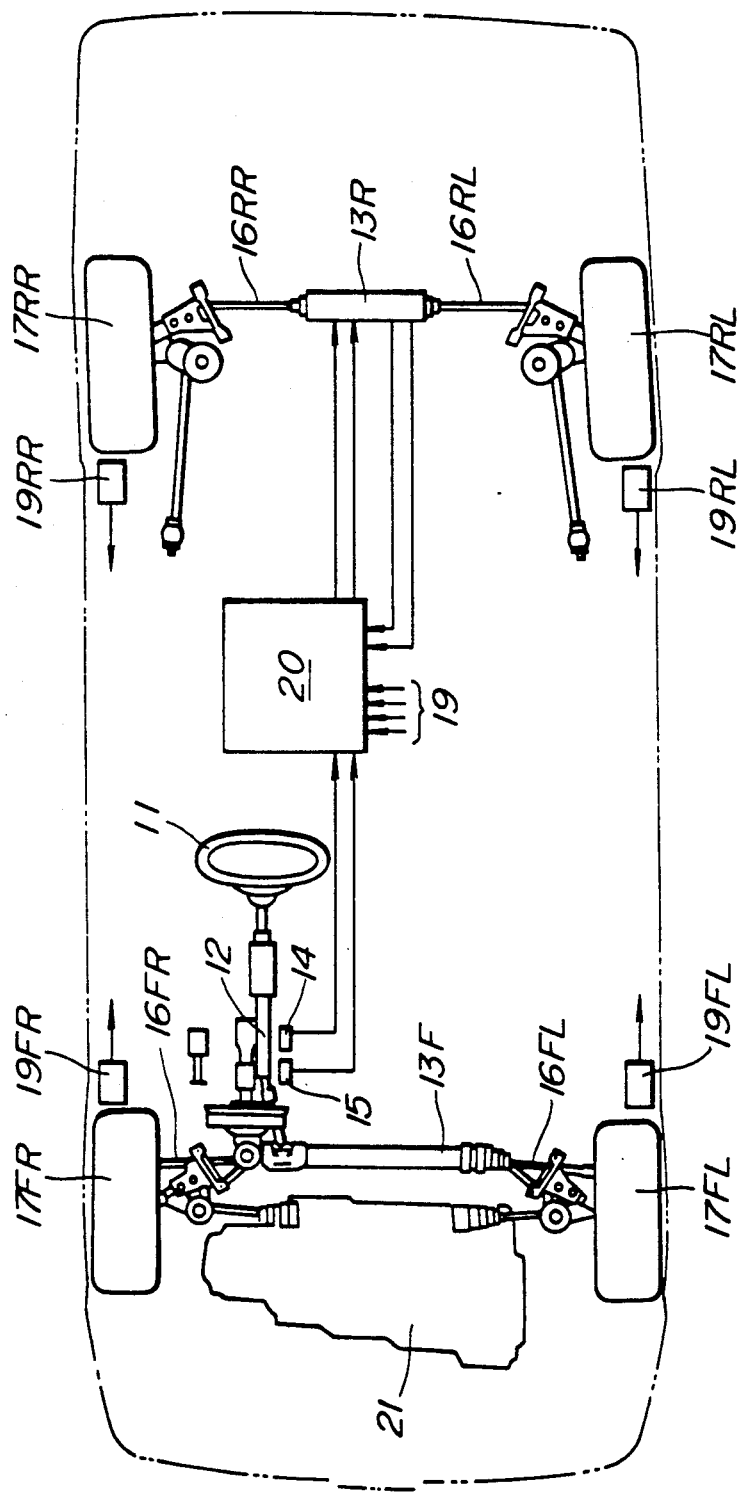
FIG. 1 is a schematic plan view of a four wheel steering apparatus which incorporates a steering angle detecting device according to the present invention.

As shown in FIG. 1, a steering wheel 11 of a four-wheel-steerable motor vehicle is operatively coupled to a rack-and-pinion steering gear mechanism which is accommodated in a front gear housing 13F, through a steering shaft 12. Near the steering shaft 12, there are disposed first and second front wheel steering angle sensors 14, 15 for detecting the angular displacement of the steering shaft 12. The steering gear mechanism in the front gear housing 13F has a pinion rotatable in unison with the steering shaft 12 and held in mesh with a rack which extends in the transverse direction of the motor vehicle. The rack has its opposite ends connected to left and right front wheels 17FL, 17FR through steering linkages such as tie rods 16FL, 16FR, respectively, so that any steering action of the steering wheel 11 can be transmitted to the front wheels 17FL, 17FR. The front wheels 17FL, 17FR and rear wheels 17RL, 17RR are associated with respective vehicle speed sensors 19FL, 19FR, 19RL, 19RR which are electrically connected to a controller 20. The front wheels 17FL, 17FR are connected to a power unit 21 including an engine.

Figure 2:
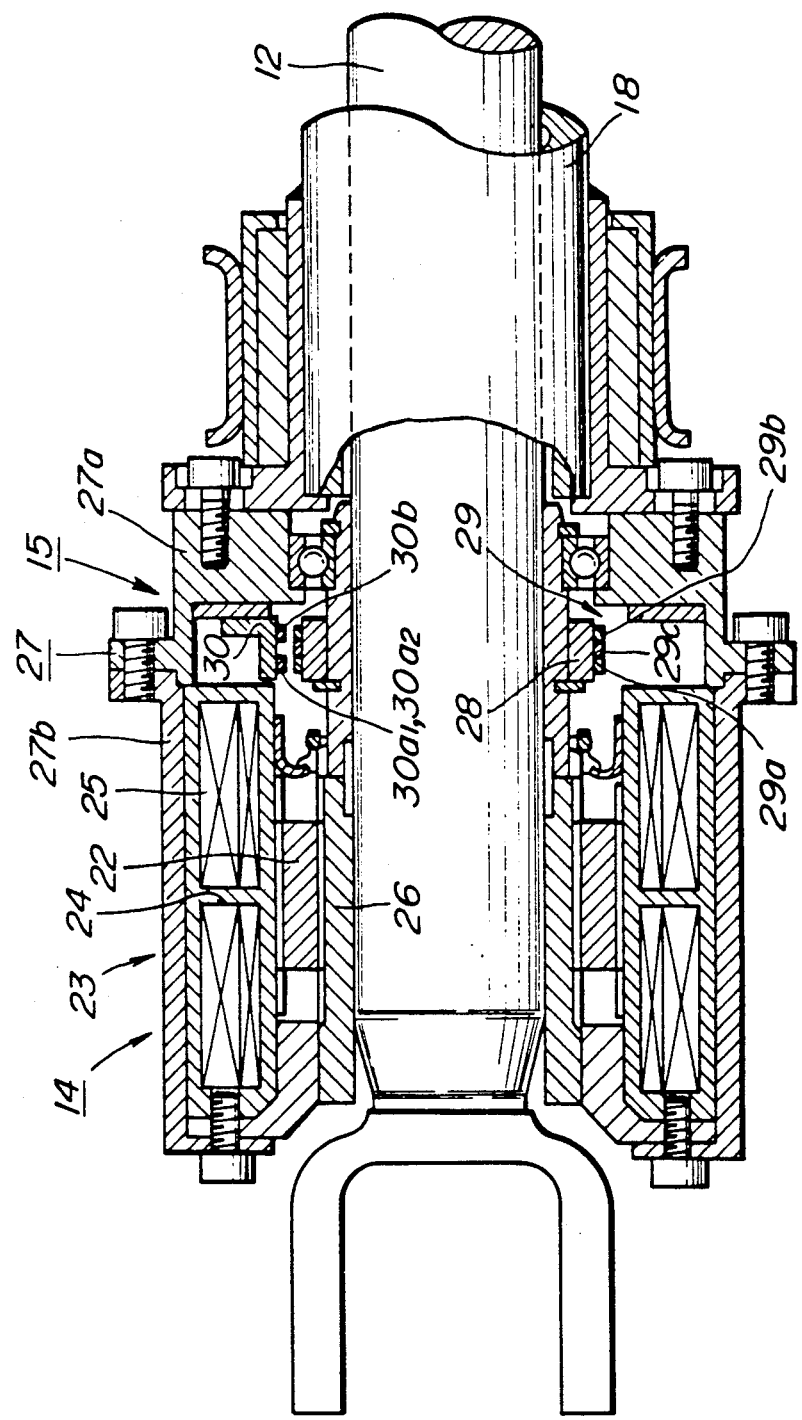
FIG. 2 is a cross-sectional view of a front wheel steering angle detecting device.

As shown in FIG. 2, the steering shaft 12 is rotatably inserted through a column 18 that is fixed to a vehicle body of the motor vehicle. The first front wheel steering sensor 14, which comprises an analog sensor, is mounted on the column 18, and the second front wheel steering sensor 15, which comprises a digital sensor, is mounted on the column 18.

The first front wheel steering angle sensor 14 comprises a differential transformer assembly which has a substantially tubular movable iron core 22 and a differential transformer 23. A housing 27 which is joined to the column 18 comprises two members 27a, 27b coupled together. The differential transformer 23 comprises an exciting primary coil, two detecting secondary coils, and a compensating tertiary coil, which are collectively indicated by the reference numeral 25, these coils being encased in a holder 24 placed in the housing 27. The movable iron core 22 has an inner circumferential surface threaded over the outer circumferential surface of a collar 26 which is fixedly disposed around the steering shaft 12. The outer circumferential surface of the movable iron core 22 is splined to the inner circumferential surface of the holder 24 so that the movable iron core 22 is not rotatable with but axially movable along the holder 24. When the steering shaft 12 rotates about its own axis, the movable iron core 22 is axially movable by a distance commensurate with the angular displacement of the steering shaft 12. The coils 25 of the differential transformer 22 are electrically connected to the controller 20, and produce a detected signal which has a potential corresponding to the position of the movable iron core 22 which represents the steering angle of the steering wheel 11. More specifically, an AC signal is supplied to energize the primary coil of the differential transformer 23, whereupon the secondary coils differentially produce a detected signal having a voltage V corresponding to the position of the movable iron core 22, and applies the detected signal to the controller 20.

The second front wheel steering angle sensor 15 is positioned rightwardly (as shown in FIG. 2) of the movable iron core 22. The second front wheel steering angle sensor 15 comprises a holding member 28 fitted over the collar 26, a rotating magnetic assembly 29 fixed to the outer circumferential surface of the holding member 28, and a detector unit 30 fixed to the member 27a of the housing 27. The rotating magnetic assembly 29 includes a multi-pole member 29a having a number of magnetic poles (e.g., 60 magnetic poles) arrayed at equal intervals in a direction of rotation, i.e., around the steering shaft 12, and a few-pole member 29b having at least one magnetic pole. The multi-pole member 29a and the few-pole member 29b are axially spaced and coaxially arranged with a spacer 29c being interposed therebetween. The one or more magnetic poles of the few-pole member 29b is are positioned in a neutral position of the steering wheel 11 (i.e., the steering position in which the motor vehicle runs straight). The detector unit 30 has three magnetic sensitives elements 30a1, 30a2, 30b which are electrically connected to the controller 20. The magnetic sensitive elements 30a1, 30a2, 30b may comprise coils, Hall effect devices, or MR devices. The magnetic sensitive elements 30a1, 30a2 are located axially in the same position and angularly spaced around the steering shaft 12 in confronting relation to the multi-pole member 29a. The magnetic sensitive element 30b is axially spaced from the magnetic sensitive elements 30a1, 30a2, and confronts the few-pole member 39b. As the rotating magnetic assembly 29 rotates, the magnetic sensitive elements 30a1, 30a2 detect a change in the magnetic field produced by the multi-pole member 29a, and apply pulse signals af, bf which have a certain phase difference, e.g., a 90° phase difference, to the controller 20. Likewise, the magnetic sensitive element 30b detects a change in the magnetic field produced by the few-pole member 29b, and applies a pulse signal Sf to the controller 20.

The pulse signals af, bf generated by the magnetic sensitive elements 30a1, 30a2 are applied to a D flip-flop in the controller 20. The D flip-flop determines the phase of the pulse signals af, bf, and produces an output signal which is of a higher potential when the pulse signal af leads the pulse signal bf and of a lower potential when the pulse signal bf leads the pulse signal af. Therefore, the direction in which the rotating magnetic assembly 29 rotates is determined on the basis of the pulse signals af, bf. The pulse signal Sf generated by the magnetic responsive element 30b is used as a basis for determining the steering neutral position.

Figure 3:
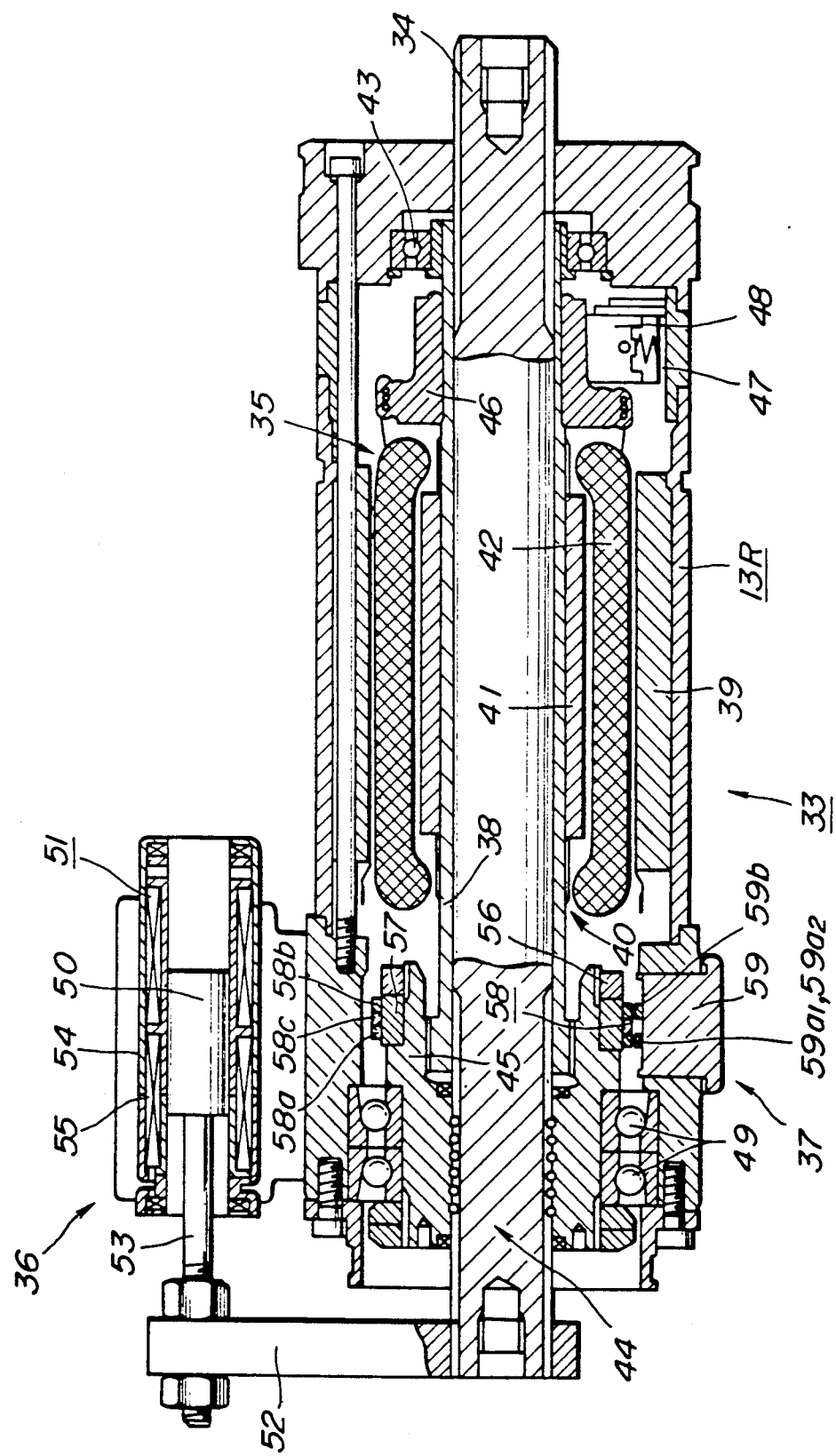
FIG. 3 is a cross-sectional view of a rear wheel steering angle detecting device.

In FIG. 1, a rear gear housing 13R is disposed in a rear portion of the vehicle body and houses therein a rear wheel steering mechanism 33 shown in FIG. 3. As shown in FIG. 3, the rear wheel steering mechanism 33 comprises a rod 34 supported in the housing 13R for sliding movement in the transverse direction of the vehicle body and having opposite ends coupled to the rear wheels 17RL, 17RR through steering linkages including tie rods 16RL, 16RR, respectively, a motor 35 mounted in the housing 13R coaxially with the rod 34, a first rear wheel steering angle sensor 36 in the form of an analog sensor for detecting axial displacement of the rod 34, and a second rear wheel steering angle sensor 37 in the form of a digital sensor for detecting angular displacement of an output shaft 38 of the motor 35.

The motor 35 has a field magnet 39 secured to the inner wall of the housing 13R, and a rotor 40 disposed between the field magnet 39 and the rod 34 and rotatable coaxially with the rod 34. The rotor 40 comprises a laminated iron core 41 having a skew groove and a multiplex armature winding 42, the iron core 41 and the armature winding 42 being securely mounted coaxially on the output shaft 38 which is of a hollow cylindrical shape. The output shaft 38 has a righthand end (as shown) whose outer circumferential surface is supported by an inner circumfererential surface of the gear housing 13R by a bearing 43, and also has a lefthand end (as shown), whose outer circumferential surface is coupled to a ball nut 45 of a ball screw mechanism 44 (described later on). The armature winding 42 is electrically connected to the controller 20 through a commutator 46 fixed to a righthand outer circumferential surface of the output shaft 38 and a brush 48 which is slidably supported in a holder 47 and resiliently held in contact with the commutator 46.

The ball nut 45 of the ball screw mechanism 44 is of a substantially hollow cylindrical shape and is coupled to the output shaft 38 of the motor 35, the ball nut 45 being supported on an inner circumferential surface of the housing 13R through a ball bearing 49. The rod 34 has a ball groove defined therein within a range corresponding to the distance traversed by the rod 34. The ball nut 45 is threaded over the rod 34 with a number of circulating balls rollingly riding in a ball groove defined in the ball nut 45 and the ball groove in the rod 34. When the ball nut 45 is rotated by the output shaft 38 of the motor 35, the ball screw mechanism 44 converts the rotary motion of the ball nut 45 into axial linear motion of the rod 34. The rod 34 is supported by the housing 13R for axial movement, but against rotary movement therein.

The first rear wheel steering angle sensor 36 comprises, as with the first front wheel steering angle sensor 14, a differential transformer assembly having a movable iron core 50 displaceable in unison with the rod 34 and a differential transformer 51 for producing a detected signal having a potential depending on the position of the movable iron core 50. The movable iron core 50 is supported by an attachment rod 53 on a stay 52 which is perpendicularly fixed to an end of the rod 34, so that the movable iron core 50 can move parallel to and in unison with the rod 34. The differential transformer 51 comprises a coil assembly 55 which includes a hollow holder 54 fixed to and lying parallel to the housing 13R, and a primary coil and two secondary coils which are substantially cylindrical and held in the holder 54. The movable iron core 50 is axially movably fitted in the coil assembly 55. The coil assembly 55 is electrically connected to the controller 20 so that the coil assembly 55 applies a detected differential signal having a potential V corresponding to the position of the movable iron core 50 to the controller 20.

As with the second front wheel steering angle sensor 15, the second rear wheel steering angle sensor 37 comprising a holding member 57 fixedly mounted by a lock nut 56 on an outer circumferential surface of the ball nut 45 of the ball screw mechanism 44, a substantially cylindrical rotating magnetic assembly 58 fixed to an outer circumferential surface of the holding member 57 for rotation with the ball nut 45, and a detector unit 59 attached to the housing 13R and electrically connected to the controller 20. The rotating magnetic assembly 58 includes a multi-pole member 58a having a number of magnetic poles (e.g., 60 magnetic poles) arrayed at equal intervals in a direction of rotation, i.e., around the circumference of rod 34, and a few-pole member 58b having at least one magnetic pole. The multi-pole member 58a and the few-pole member 58b are axially joined to each other by a spacer 58c therebetween. The at least one magnetic pole of the few-pole member 58b is positioned in a netural position of the rear wheels 17RL, 17RR.

The detector unit 59 has three magnetic sensitive elements 59a1, 59a2, 59b which are electrically connected to the controller 20. The magnetic sensitive elements 59a1, 59a2 are angularly spaced around the rod 34 in confronting relation to the multi-pole member 58a. The magnetic sensitive element 59b confronts the few-pole member 58b. As the rotating magnetic assembly 58 rotates, the magnetic sensitive elements 59a1, 59a2 detect a change in the magnetic field produced by the multi-pole member 58a, and apply pulse signals ar, br which have a certain phase difference, e.g., a 90° phase difference, to the controller 20. Likewise, the magnetic sensitive element 59b detects a change in the magnetic field produced by the few-pole member 58b, and applies a pulse signal Sr to the controller 20.

As with the pulse signals from the second front wheel steering angle sensor 15, the pulse signals ar, br are used as a basis for calculating a steering angle and determining a steering direction, and the pulse signal Sr is used as a basis for determining a steering neutral position.

Figure 4:
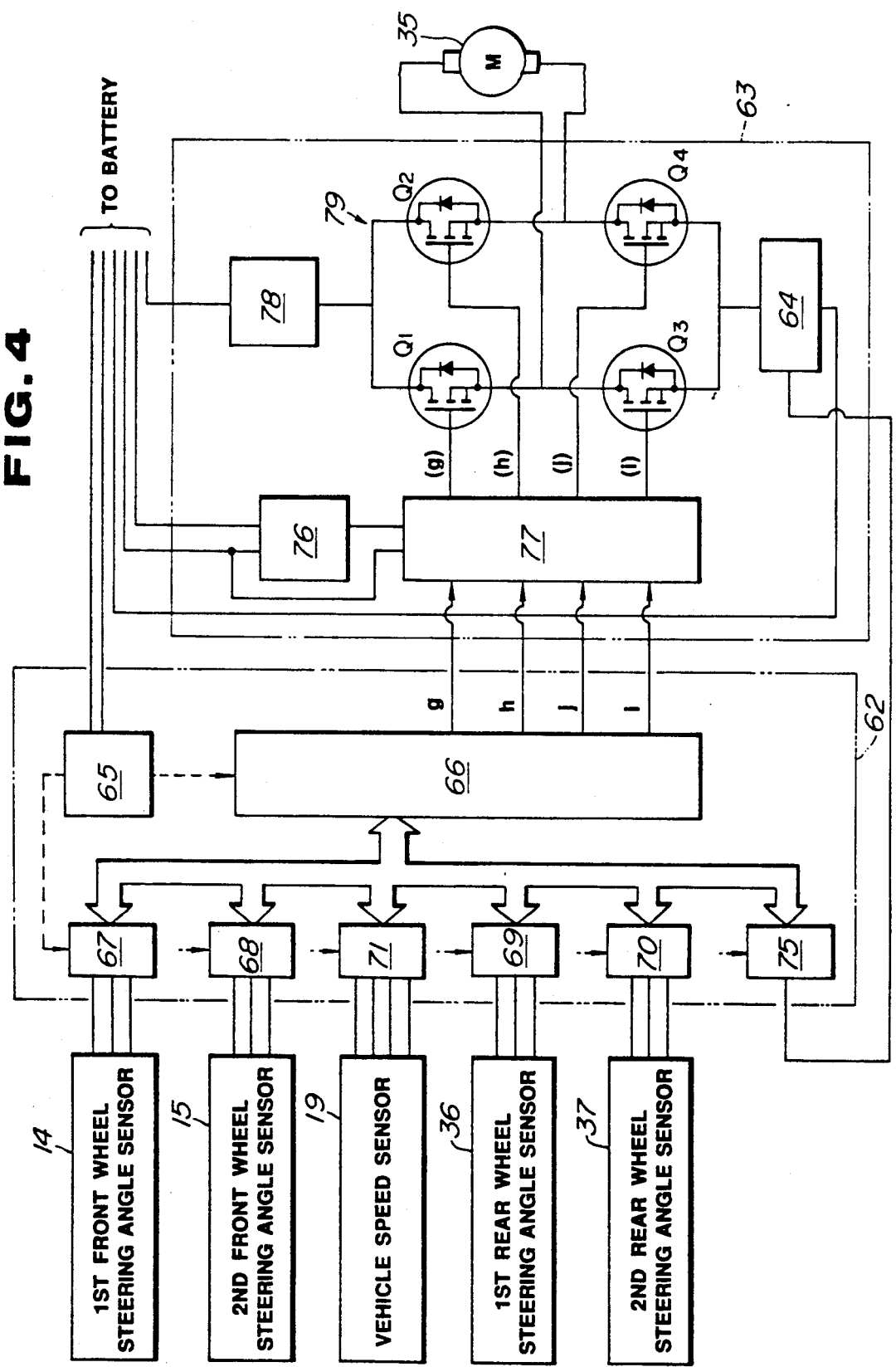
FIG. 4 is a block diagram of a steering angle control system.

As shown in FIG. 4, the controller 20 has a control circuit 62 and a drive circuit 63. The sensors 14, 15, 19, 36, 37 are connected to the control circuit 62, to which a current sensor 64 of the drive circuit 63 is also connected. The motor 35 is connected to the drive circuit 63.

The control circuit 62 comprises a constant-voltage supply circuit 65, a microcomputer 66, and input interfaces 67, 68, 69, 70, 71. The constant-voltage supply circuit 65 is connected to a battery (not shown) through a fuse, and supplies constant-voltage electric power to the elements of the control circuit 62. The sensors 14, 15, 36, 37, 19 are connected respectively to the input interfaces 67, 68, 69, 70, 71, which are also connected to the microcomputer 66 through a data bus. The input interface 67 to which the first front wheel steering angle sensor 14 is connected comprises an oscillator an amplifier, a rectifier, and an A/D converter. The input interface 67 supplies an AC signal to the primary coil of the first front wheel steering angle sensor 14, shapes a signal induced by the secondary coils thereof and converts the shaped signal into a digital signal representing a steering angle, and supplies the digital signal to the microcomputer 66. The input interface 68 to which the second front wheel steering angle sensor 15 is connected has a temporary storage counter, and supplies the output signals af, bf from the magnetic sensitive elements 30a1, 30a2 to the microcomputer 66 in response to an input signal from the microcomputer 66. Similarly, the input interface 69 to which the first rear wheel steering angle sensor 36 is connected applies an AC signal to the primary coil of the sensor 36 to energize the same, shapes a signal induced by the secondary coils thereof, converts the shaped signal into a digital signal, and supplies the digital signal to the microcomputer 66. The input interface 70 to which the second rear wheel steering angle sensor 37 is connected supplies the output signals ar, br, Sr from the magnetic sensitive elements 59a1, 59a2, 59b to the microcomputer 66 in response to an input signal from the microcomputer 66.

The input interface 71 to which the vehicle speed sensors 19 are connected has a waveform shaper and a counter, and applies a signal indicative of a vehicle speed, which is based on the output signals from the vehicle speed sensors 19, to the microcomputer 66. The control circuit 62 also has an input interface 75 to which the current sensor 64 is connected, the input interface 75 having an amplifier and an A/D converter. The input interface 75 converts an output signal from the current sensor 64 into a digital signal and supplies the digital signal to the microcomputer 66.

The microcomputer 66 has a CPU, a ROM, a RAM, and a clock, the CPU including logic arithmetic elements such as the D flip-flop, referred to above, AND gates, etc., and various counters. The microcomputer 66 processes the signals which are supplied from the sensors through the input interfaces 67, 68, 69, 70, 71, 75 and determines a duty factor for a current to be supplied to the motor 35 according to a program stored in the ROM, and then supplies pulse-width-modulated (PWM) signals g, h, i, j, which are representative of the duty factor, to the drive circuit 63.

The drive circuit 63 comprises a booster 76, a gate driver 77, the current sensor 64, a relay 78, and a switch circuitry 79. The gate driver 77 is connected directly to the battery, and the switch circuitry 79 is connected to the battery through the relay 78. The switch circuitry 79 comprises a bridge of four field-effect transistors (FETs) Q1, Q2, Q3, Q4 whose gates are connected to the gate driver 77. The FETs Q1, Q2 have drains connected to the battery and sources to the drains of the FETs Q3, Q4. The FETs Q3, Q4 have sources connected to ground (the negative terminal of the battery) through the current sensor 64. The motor 35 is connected between the juction between the source and drain of the FETs Q1, Q3 and the junction between the source and drain of FETs Q2, Q4. The booster 76 increases the voltage of the battery and applies the increased voltage to the gate driver 77. The gate driver 77 applies drive signals to the gates of the FETs Q1, Q2, Q3, Q4 of the switch circuitry 79 based on the PWM signals g, h, i, j transmitted from the microcomputer 66. The current sensor 64 detects a current flowing through the motor 35, and applies a signal indicating the detected current to the input interface 75. In the switch circuitry 79, a drive signal having a duty factor corresponding to the PWM signal g is applied to the gate of the FET Q1, a drive signal having a duty factor corresponding to the PWM signal h is applied to the gate of the FET Q2, a drive signal having a duty factor corresponding to the PWM signal i is applied to the gate of the FET Q3, and a drive signal having a duty factor corresponding to the PWM signal j is applied to the gate of the FET Q4.

Operation of the steering control system of the four wheel steering apparatus thus constructed will be described below with reference to FIGS. 5 and 6.

Figure 5:
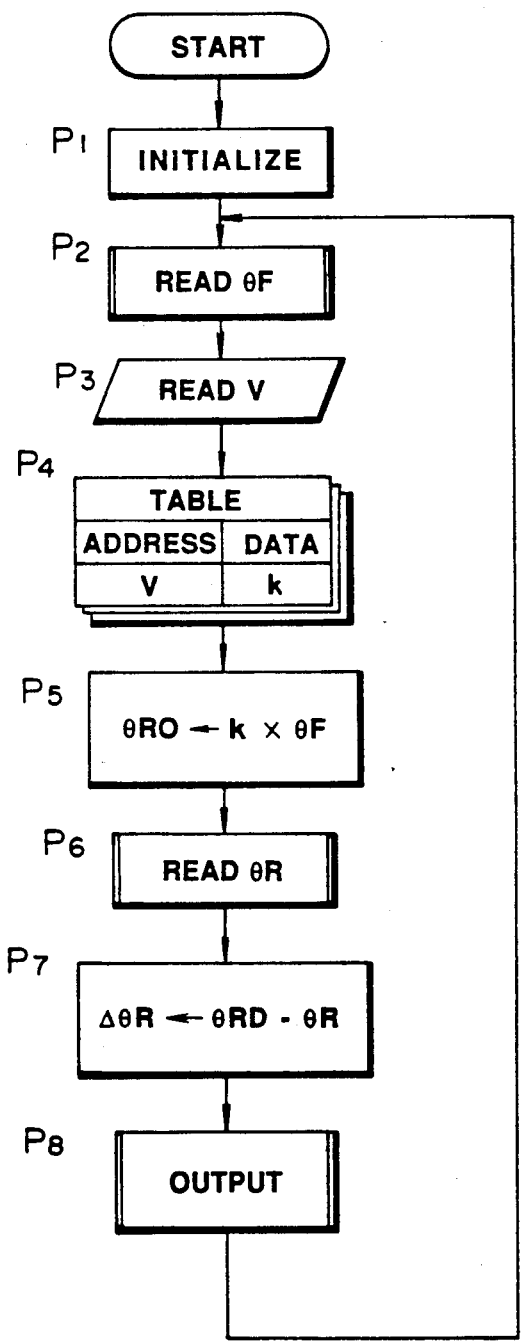
FIGS. 5 and 6 are flowcharts showing a steering angle control sequence.
Figure 6:
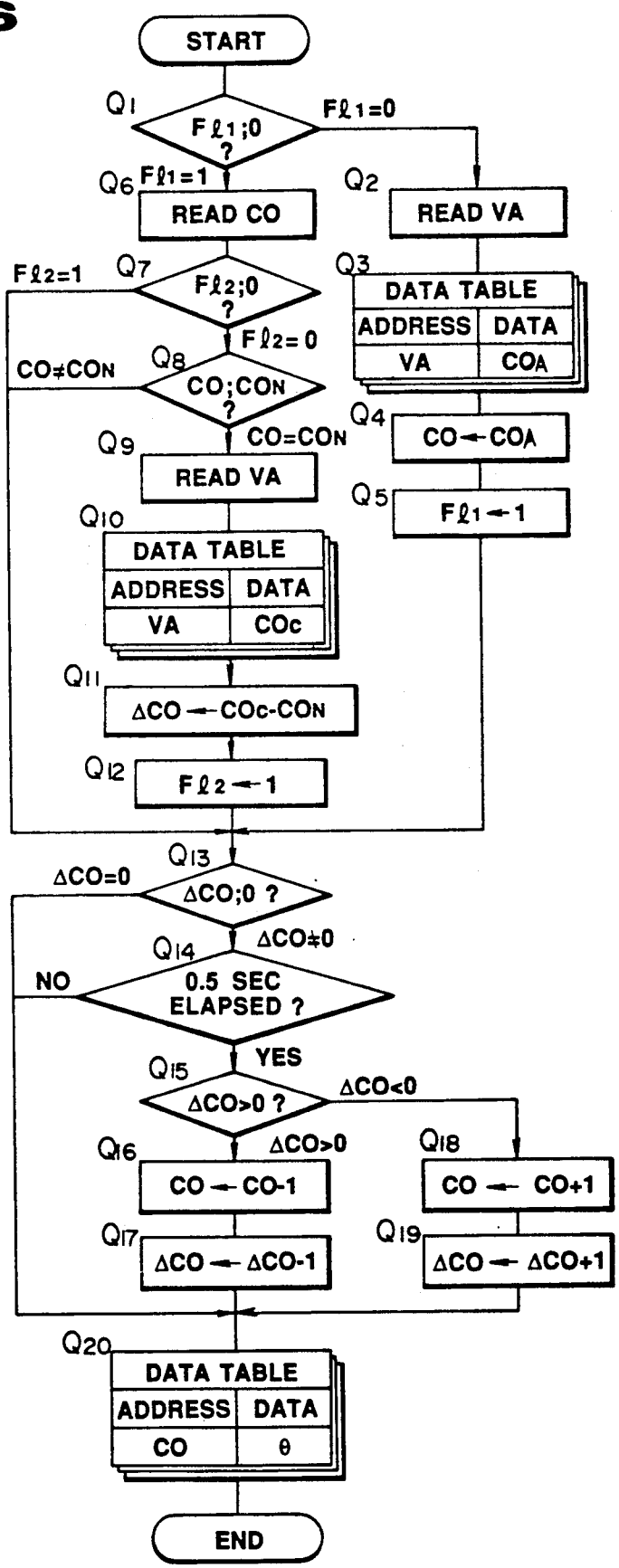

In the steering control system, the microcomputer 66 executes a main routine shown by the flowchart of FIG. 5 and a subroutine shown by the flowchart of FIG. 6 for the control of the motor 35.

Figure 8:
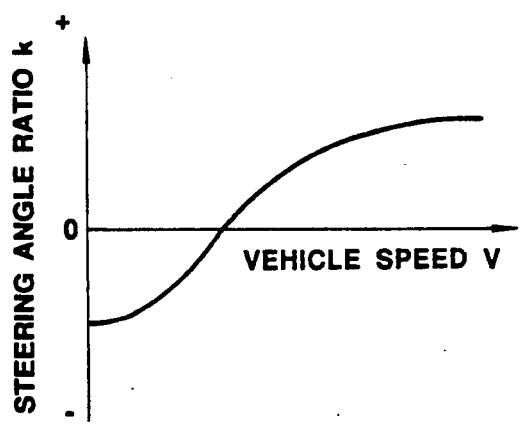
FIG. 8 is a diagram showing a data table used to determine a steering angle ratio.

When an ignition key is operated to turn on a key switch, the microcomputer 66 and other circuit elements are supplied with electric power, and the microcomputer 66 starts to operate. In a step P1 shown in FIG. 5, the microcomputer 66 is initialized, erasing data stored in internal registers and addressing the registers. Then, an actual front wheel steering angle $\theta F$ is read according to the subroutine shown in FIG. 6 in a step P2. A vehicle speed V is calculated using the output signal from the vehicle speed sensors 19 and read in a step P3. In a next step P4, a steering angle ratio k is formed in a data table of vehicle speeds and steering angle ratios as shown in FIG. 8, using the vehicle speed V as an address. Then, in a following step P5, a rear wheel target steering angle $\theta RO$ is determined by multiplying the front wheel steering angle $\theta F$ by the steering angle ratio k according to the following equation (1):

$$\theta RO = k \cdot \theta F \qquad (1)$$

In a step P6, an actual rear wheel steering angle $\theta R$ is read according to a subroutine which is the same as the subroutine shown in FIG. 6. In a next step P7, a steering angle deviation or difference $\Delta\theta R$ between the rear wheel target steering angle $\theta RO$ and the actual rear wheel steering angle $\theta R$ is determined according to the following equation (2):

$$\Delta\theta R = \Delta RO - \theta R \qquad (2)$$

In a step P8, a duty factor for a current to be supplied to the motor 35 is determined depending on the magnitude of the absolute value of the deviation $\Delta\theta R$, and a direction in which to pass the current through the motor 35 is determined depending on the sign (positive or negative) of the deviation $\Delta\theta R$, followed by energizing the armature winding 42 of the motor 35 with a current which has the determined duty factor and direction. The above rear wheel steering control mode of operation is disclosed in detail in U.S. patent application Ser. No. 07/226,070, filed Jul. 29, 1988, which matured into U.S. Pat. No. 4,939,653.

The subroutine for the reading of the front wheel steering angle $\theta F$ in the step P2 and the reading of the rear wheel steering angle $\theta R$ in the step P6 will be described below with reference to the flowchart of FIG. 6. In the following description, the first front wheel steering angle sensor 14 will be referred to as the analog sensor 14, and the second front wheel steering sensro 15 as the digital sensor 15, while only the subroutine for the reading of the front wheel steering angle $\theta F$ will be described. The subroutine for the reading of the rear wheel steering angle $\theta R$ will not be described as it is the same as the subroutine for the reading of the front wheel steering angle $\theta F$.

As shown in FIG. 6, the value of a start flag F11 is determined in a step Q1. The start flag F11 indicates whether a starting basic value $CO_A$ (described later) is read into a counter CO or not, i.e., whether the execution of the subroutine is the first time or not. The start flag F11 is initially set to 0 when the microcomputer 66 is initialized in the step P1, and is set to 1 in the step Q5. If the start flag F11 is 0, then a branch flow beginning with a step Q2 is executed, and if the start flag F11 is 1, then a flow beginning with a step Q6 is executed.

Figure 7:
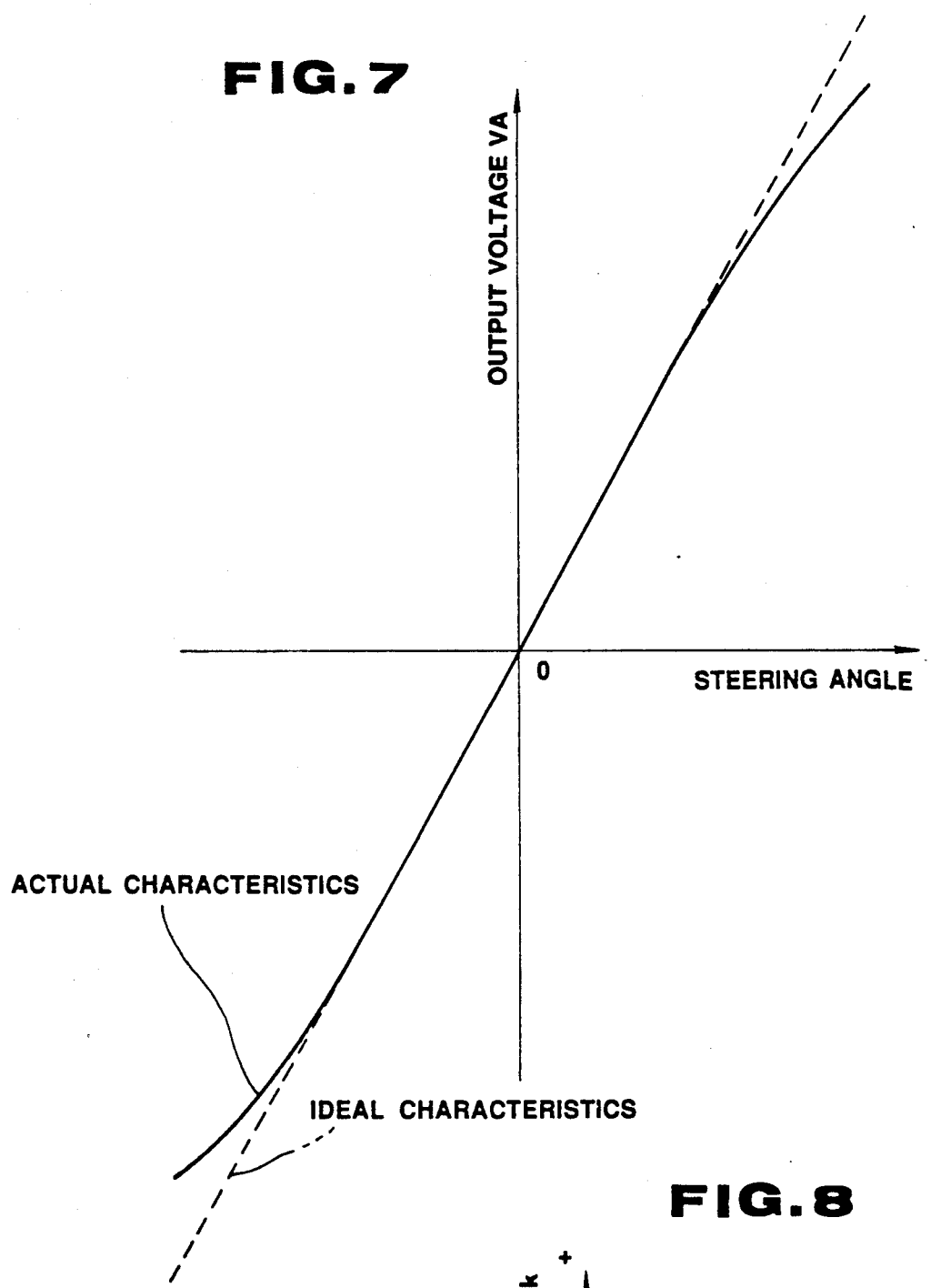
FIG. 7 is a diagram showing output characteristics of a differential transformer.

In the step Q2, an output signal VA from the differential transformer 23 of the analog sensor 14 is read. More specifically, the output signal VA is read a plurality of times (e.g., 32 times) at constant intervals within a predetermined period of time, and the average of the read values is calculated as the output signal VA. Therefore, any periodic fluctuations which the output signal of the analog sensor 14 may be subject to are eliminated, and the output signal VA is read with high accuracy. Since the linearity of the output signal of the analog sensor 14 is impaired in the larger steering angle range as shown in FIG. 7, the output signal VA is read more frequently in step Q5 than it is read in the steering neutral position is a later step Q9, so that an accurate value is read as the output signal VA. The period of time in which the output signal VA is read a plurality of times is equal to or longer than the periodic interval of any fluctuations of the output signal VA.

In a next step Q3, the starting basic value $CO_A$ used as an initial value for the counter CO is determined from a data table indicated by the solid line in FIG. 7, using the output signal VA as an address. The data table used in the step Q3 employs data representative of average characteristics of differential transformers 23 of the same type, and is effective to avoid variations which would otherwise be caused by different characteristics resulting from manufacturing errors or the like.

In a step Q4, the starting basic value $CO_A$ is set as an initial value for the counter CO. In a next step Q5, the flag F11 is set to 1, indicating that the subroutine is executed once, and then control proceeds to a step Q13.

If the subroutine has been executed once and the flag F11 is 1 in the step Q1, then control goes from the step Q1 to the step Q6 in which a count CO held by a counter C is read. The counter C reads the number of pulse signals produced by the digital sensor 15. At this time, whether the steering direction is right or left is determined according to the phase of the output signals af, bf of the magnetic sensitive elements 30a1, 30a2. If the steering direction is right, for example, then the number of pulses is added to the count CO held by the counter C, and if the steering direction is left, for example, the number of pulses is subtracted from the count CO held by the counter C.

If the subroutine is being executed for a second or subsequent time, and since the counter has held the starting basic value $CO_A$, at the time of starting the detection, in the step Q4, the counter C uses the basic value $CO_A$ as its initial value, and the number of pulses produced by the digital sensor 15 is added to or subtracted from the value $CO_A$.

Then, a step Q7 determines the value of a flag Fl2. If the flag Fl2 is 0, then a flow beginning with a step Q8 is executed, and if the flag Fl2 is 1, then a flow beginning with the step Q13 is executed. The flag Fl2 indicates whether a corrective value $CO_C$ which is established in the steering neutral position is read or not. The flag Fl2 is set to 0 when the microcomputer 66 is initialized in the step P1 in FIG. 5. After the corrective value $CO_C$ has been read, the flag Fl2 is set to 1, as described later.

The step Q8 determines whether the steering mechanism is in the steering neutral position or not. If in the neutral position, then a step Q9 is executed, and if not in the neutral position, then the step Q13 is executed. In the present embodiment, the steering neutral position is checked by determining whether the count CO is of a numerical value $CO_N$ which indicates the steering neutral position or not. The steering neutral position may, however, be determined on the basis of a pulsed output signal Sf from the magnetic sensitive element 30b. The pulse signal Sf is issued a plurality of times in the full steering angle range. The neutral position is determined when the output signal from the analog sensor 14 indicates a substantially neutral position and also the pulse signal Sf is applied. The neutral position may also be determined by an output signal from a detector such as a limit switch.

In a step Q9, the output signal VA from the analog sensor is read in the same manner as in the step Q2. In the step Q9, the output signal VA is also read a plurality of times (e.g., 16 times) and the average value is used. In a next step Q10, a corrective numerical value $CO_C$ is found from the data table indicated by the solid line in FIG. 7, using the output signal VA as an address. The determination of the value using the data table in the steps Q10, Q3 may be replaced with digital-to-analog conversion using the A/D converters in the input interfaces.

Then, a deviation or difference $\Delta CO$ between the corrective numerical value $CO_C$ and the numerical value $CO_N$ indicative of the steering neutral position is found in a step Q11, and the flag Fl2 is set to 1 in a step Q12.

The step Q13 then determines whether the deviation $\Delta CO$ is 0 or not. If the deviation $\Delta CO$ is 0 or is not established, then a step Q20 is executed, and if the deviation $\Delta CO$ is not 0, then a step Q14 is executed.

In the step Q14, it is determined whether a predetermined time t (e.g., 0.5 second) after the previous execution of a step Q16 or a step Q18 has elapsed or not. If not, then the step Q20 is executed, and if elapsed, then a step Q15 is executed. More specifically, in the step Q14, a time interval at which the step Q16 or the step Q18 is to be executed is defined, and the count CO is gradually corrected so that the steering angle will not change abruptly.

The step Q15 determines whether the deviation $\Delta CO$ is positive or negative. If the deviation $\Delta CO$ is positive, then steps Q16, Q17 are exectued, and if the deviation $\Delta CO$ is negative, then steps Q18, A19 are executed. In the step Q16, the count CO is corrected by being decremented by 1. In the step Q17, the deviation $\Delta CO$ is decremented by 1 for a next correcting process. In the step Q18, the count CO is corrected by being incremented by 1. In the step Q19, the deviation $\Delta CO$ is incremented by 1 for a next correcting process. In the steps Q16, Q17 or the steps Q18, Q19, the count CO is gradually corrected using, as a reference, the value $CO_C$ which is determined on the basis of the output signal of the analog sensor, in the neutral position in which the output signal of the analog sensor is highly accurate.

In the step Q20, a steering angle $\theta$ is determined from the data table shown in FIG. 7, using the ideal linear characteristics indicated by the broken line, with the count CO used as an address.

In the above embodiment, the corrective value $CO_C$ is read once when the neutral position is first reached. However, the corrective value may be read each time the main routine is executed.

With the present invention, as described above, the steering angle is detected highly accurately without being adversely affected by disturbances such as fluctuations in the power supply voltage. Since the data are not required to be stored when the power supply is turned off, no data memory is necessary, and the cost of manufacture is reduced.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A steering angle detecting device for a steering apparatus having a component which is displaceable depending on a change in a steering angle, comprising:
   an analog sensor for detecting a displacement of the component and producing an analog signal having a potential corresponding to the position of the component;
   a digital sensor for detecting the displacement of the component and producing a predetermined number of pulses corresponding to a unit change in the steering angle;
   basic count determining means for determining a basic count corresponding to the steering angle based on the analog signal produced by said analog sensor when said steering angle starts to be detected;
   counting means for generating and holding a count corresponding to the steering angle by adding or subtracting the numer of pulses produced by said digital sensor to or from said basic count;
   steering angle calculating means for calculating said steering angle based on said count; and
   correcting means for correcting said count when the component is positioned in a position corresponding to a predetermined reference steering angle.

2. A steering angle detecting device according to claim 1, wherein said correcting means comprises means for determining a corrective count based on an analog signal which is produced by said analog sensor when the component is in said position corresponding to said predetermined reference steering angle, and for correcting said count so as to be equal to said corrective count.

3. A steering angle detecting device according to claim 1, wherein said correcting means comprises means for correcting said count when the count held by said counting means has a value corresponding to said reference steering angle.

4. A steering angle detecting device according to claim 1, wherein said correcting means includes an additional sensor for producing a signal only when the component is in said position corresponding to said reference steering angle, and means for correcting said count when the signal is produced by said additional sensor.

5. A steering angle detecting device according to claim 4, wherein said correcting means comprises means for determining whether the component is in said position corresponding to said reference steering angle, based on the signal produced by said additional sensor and the analog signal produced by said analog sensor.

6. A steering angle detecting device according to claim 1, wherein said analog sensor comprises a movable iron core which is displaceable in unison with the component and a differential transformer for producing a detected signal having a potential corresponding to the position of said movable iron core.

7. A steering angle detecting device according to claim 6, wherein said basic count determining means comprises means for reading the signal from said differential transformer a plurality of times at prescribed intervals of time and determinimg the basic count based on the average of the read values.

8. A steering angle detecting device according to claim 1, wherein said digital sensor comprises a plurality of magnetic poles spaced at equal intervals on the component, and a pair of magnetic sensitive elements for detecting a change in a magnetic field produced by said magnetic poles and producing the predetermined number of pulses corresponding to the unit change in the steering angle, said magnetic sensitive elements being arranged such that they produce output signals with a phase difference therebetween, said counting means comprising means for determining whether the number of pulses produced by said digital sensor is to be added or subtracted, to said basic count based on phases of the output signals from said magnetic sensitive elements.

9. A steering angle detecting device according to claim 4, wherein said additional sensor comprises at least one magnetic pole disposed in a predetermined position on the component and a magnetic sensitive element for detecting a change in a magnetic field produced by said at least one magnetic pole and producing a pulse signal only when the component is in said position corresponding to said reference steering angle.

10. A steering angle detecting device for a steering apparatus having a component which is displaceable in dependence on a change in a steering angle, comprising:
analog sensing means for detecting a displacement of the component and for producing an analog signal corresponding to the position of the component;
digital sensing means for also detecting the displacement of the component and for producing a digital signal corresponding to a unit change in the steering angle;
means for determining a steering angle based on the analog signal and the digital signal; and
correcting means for correcting the determined steering angle when the component is positioned in a position corresponding to a predetermined reference steering angle.

* * * * *

UNITED STATES PATENT AND TRADEMARK OFFICE
CERTIFICATE OF CORRECTION

PATENT NO. : 5,119,302
DATED : June 2, 1992
INVENTOR(S) : Masaru Abe; Yoshimichi Kawamoto; Mitsuya Serizawa; and Osamu Tsurumiya It is certified that error appears in the above-identified patent and that said Letters Patent is hereby corrected as shown below:

Column 3, line 49, delete "is";
        line 52, change "sensitives" to -- sensitive --.
Column 6, line 65, change "juction" to -- junction --.
Column 7, line 35, change "formed" to -- found --;
        line 51, change "= $\Delta$RO" to -- = $\theta$RO --;
        line 62, change "patent application" to -- Patent Application --.
Column 8, line 4, change "sensro" (first occurrence) to -- sensor --;
        line 32, change "Q5" to -- Q2 --.
Column 9, line 62, change "A19" to Q19 --.

Signed and Sealed this

Twentieth Day of July, 1993

Attest:

MICHAEL K. KIRK

*Attesting Officer*      *Acting Commissioner of Patents and Trademarks*